No. 860,612. PATENTED JULY 16, 1907.
C. P. SESTER.
SEEDING MACHINE ATTACHMENT.
APPLICATION FILED JUNE 13, 1906.
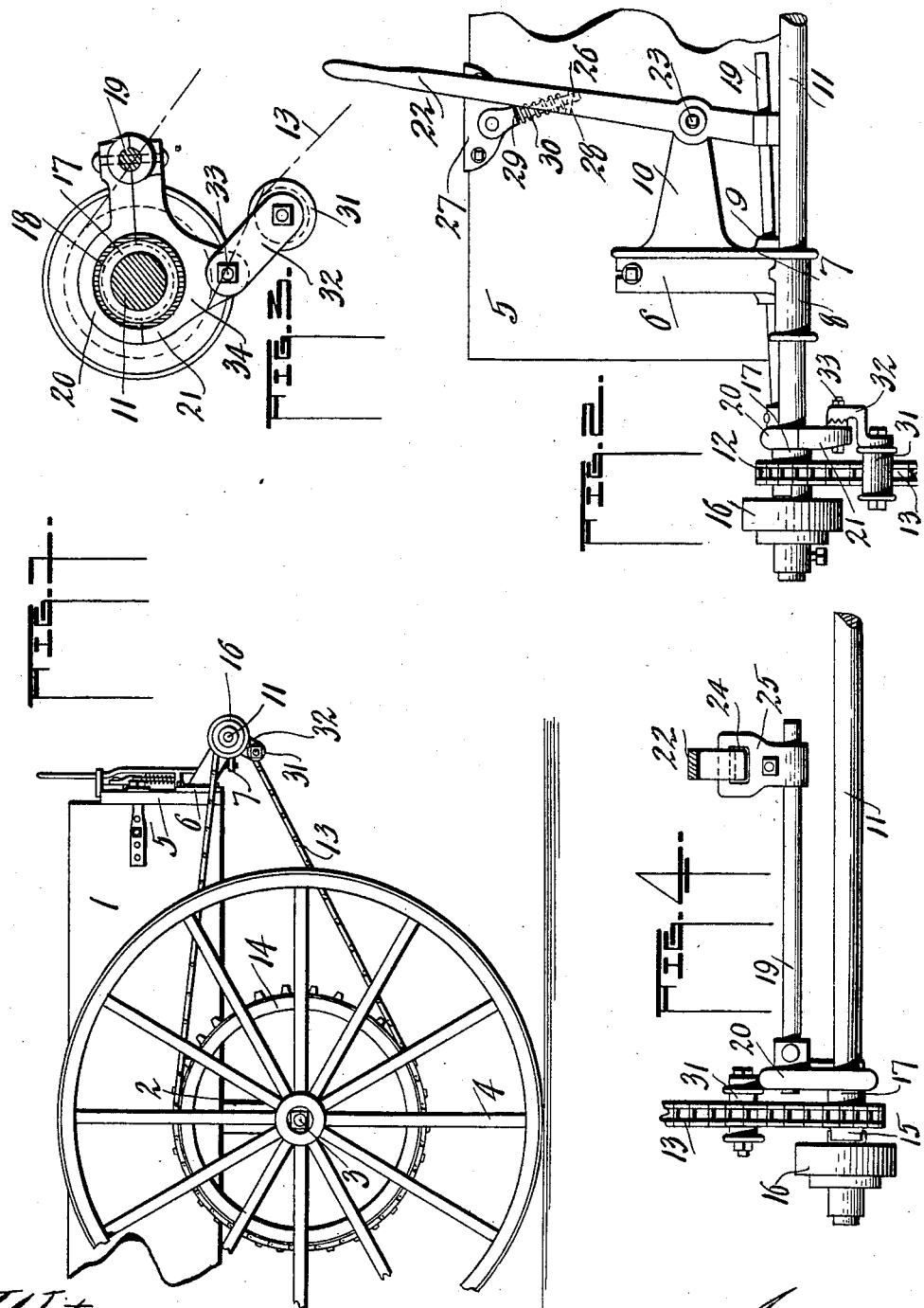

UNITED STATES PATENT OFFICE.

CHARLES P. SESTER, OF PEORIA, ILLINOIS.

SEEDING-MACHINE ATTACHMENT.

No. 860,612.  Specification of Letters Patent.  Patented July 16, 1907.

Original application filed September 27, 1905, Serial No. 280,249. Divided and this application filed June 13, 1906.
Serial No. 321,524.

*To all whom it may concern:*

Be it known that I, CHARLES P. SESTER, a citizen of the United States, residing at Peoria, in the county of Peoria and State of Illinois, have invented certain new and useful Improvements in Seeding-Machine Attachments; and I do hereby declare that the following is a full, clear, and exact description of the invention, which will enable others skilled in the art to which it appertains to make and use the same.

This invention has reference to an attachment to coöperate with a driving shaft on a broadcast distributing machine and similar devices.

This application is a division of the application filed by me on Sept. 27th 1905, for improvements in seeding machines and which bears Serial Number 280,249.

The object of the present invention is a chain guide and tightener adapted to have connection with the driven pinion on the driving shaft employed in connection with the seeding mechanism and to means for shifting said pinion and simultaneously therewith the chain guide and tightener. Said chain guide and tightener having an adjustable connection with an attachment forming a part of the means for shifting said pinion.

That the invention may be more fully understood, reference is had to the accompanying drawings, in which:—

Figure 1 is a side elevation of the rear portion of a vehicle, such as a farm wagon, showing my improvements attached thereto; Fig. 2 is an enlarged elevation looking in at the rear end of a portion of the end-gate with my improvements attached thereto; Fig. 3 is an enlarged side elevation of the chain guide and tightener and its connection with the attachment employed in connection with the pinion on the driving shaft, and Fig. 4 is a plan view and partial section of parts seen in Fig. 2.

Like numerals of reference indicate corresponding parts through the figures.

In the drawings, for convenience, 1 denotes a wagon body, only the rear portion of which is shown, and the same is carried on the bolster 2 to which is attached the rear axle 3 carrying the ground wheels 4. To the rear end of the wagon body is secured an end-gate 5. The means for securing said end-gate to the body is immaterial in this connection as any desirable means may be used for that purpose.

Attached to the rear face of the end-gate is shown a bracket 6, the same having the portion 7 projecting downwardly and rearwardly and provided with the bearings 8 and 9 and 10 is a lateral extension of the said bracket, the same adapted for the connection therewith of a lever to be described.

11 indicates a driving shaft which extends through and is journaled in the bearing 8 of the bracket 6 as shown. This driving shaft is adapted to carry suitable gearing, not shown, to be employed for transmitting motion from the driving shaft to suitable gearing, not shown, for actuating seed distributing shafts and distributers employed in connection with suitable seeding devices, such as a broadcast seeding machine not shown. The seeding devices, distributers and gearing referred to are plainly shown in the application above referred to and of which this is a division.

On the outer end of the driving shaft is carried a pinion or sprocket wheel 12, which is driven by means of a sprocket chain 13, from a driven sprocket wheel 14, which is preferably attached to the inner face of the spokes of one of the ground wheels 4, of the vehicle, best seen in Fig. 1. The sprocket pinion 12 is provided with a suitable clutch face 15 adapted to have engagement with any well known form of clutch mechanism 16 secured on the shaft 11, and said pinion 12 is slidably carried on the driving shaft to adapt it to have engagement with the clutch devices 16 and said pinion is provided with an elongated sleeve portion 17 provided with an annular groove 18, shown in dotted lines in Fig. 3. The means for shifting the driven pinion 12 on the driving shaft for connecting and disconnecting the same with the clutch devices 16, consists of a rod 19 which is slidably carried through the bearing 9 on the bracket 6 and on the outer end thereof is fixedly attached thereto, the arms 20 and 21, with portions engaging the grooved sleeve 17, in the manner seen in Fig. 3. It will thus be seen that upon shifting the rod 19, longitudinal movement may also be imparted to the sprocket pinion 12 through the engagement of the arms 20 and 21 with the grooved sleeve thereof. To accomplish this movement, I provide a lever 22 fulcrumed at 23 to the extension 10 on the bracket 6, its lower end being suitably connected to the rod 19; preferably through the connection of the lower end of the lever with a slot 24 in a bracket 25 which may be suitably secured to the rod 19. And for the purpose of locking the position of the lever 22, when once shifted, I provide the oscillating rod 26, pivoted to a bracket 27, secured to the upper edge of the end-gate 5, see Fig. 2, and the free end of the rod 26 passes loosely through a plate 28 secured to lever 22 between which and an upper shoulder portion 29 is coiled a spring 30. Thus it will be seen that upon shifting the lever 22 across the pivot of the rod 26, through the action of the spring 30, it will throw the rod into a position to lock the lever against accidental displacement through the vibration or jar of the wagon.

31 denotes a sheave wheel which is adapted to carry the chain 13, as seen in full lines in Fig. 1 and in dotted lines in Fig. 3, and said sheave wheel is carried by an arm 32, preferably secured by a bolt 33 to an ear 34 on the arm 21. The connection of the arm 32 with the ear

34 on the arm 21, is through a boss on the said ear 34 which has a serrated face matching a corresponding serrated face on the end of the arm 32. Thus, with the loosening of the bolt 33 the serrated face of the arm 32 and the ear 34 may be separated and the arm 32 swung into a desirable position, and again locked; the serrated face preventing the release or undue oscillation of the arm 32 through the vibration or the movement of the wagon.

With the provision of the above device, not only is the operator able to shift the guide, sheave wheel or tightener simultaneously with the disconnection or connection of the pinion on the driving shaft with the clutch devices, but through the provision of the sheave wheel the chain is always guided to the pinion and the same is prevented from jumping off of the pinion or being accidentally displaced through the buckling of the chain or from other causes, as the sheave wheel may be adjusted to a position to properly guide the slack portion of the chain from the pinion and such adjustment of the sheave wheel is further adapted for taking up undue slack in the said chain, all of which it is believed will be understood.

Having thus fully described my invention, what I claim and desire to secure by Letters Patent of the United States, is:—

1. In a device of the character specified, the combination of an end-gate, a bracket attached thereto, a driving shaft having one end journaled in said bracket, a pinion slidably carried on the outer end of said shaft, means for actuating the said pinion, an arm in connection with said pinion and having a serrated face, a second arm adjustably connected with said first mentioned arm and having a serrated face matching and engaging the serrated face of the first mentioned arm, and a sheave wheel carried by the lower end of the last mentioned arm, substantially as described.

2. In a device of the character specified, the combination of an end-gate, a bracket attached thereto, a driving shaft journaled in said bracket, a driving pinion slidably carried on the outer end of said shaft and having a clutch face, clutch devices secured to said shaft with which the pinion is adapted to have engagement, means for actuating said pinion, a chain tightener and guide consisting of a sheave wheel, an arm carrying such sheave wheel having a serrated face, a support to which said arm is pivotally connected, the said support having connection with the pinion and provided with a serrated face with which the corresponding face of the arm is adapted to engage, and means for slidably shifting the said pinion and simultaneously therewith the support, the arm and sheave wheel, substantially as described.

3. In a device of the character specified, the combination with a vehicle, mounted on ground wheels and having attached to one of said wheels a sprocket wheel, of an end-gate secured to the rear end of the vehicle, a bracket attached to the end-gate, a driving shaft journaled in said bracket, a pinion slidably carried on the outer end of the shaft and having a clutch face, clutch devices secured to the shaft with which the pinion is adapted to have engagement, a member connected with said pinion and adapted to be moved therewith, an arm adjustably connected with said member, a sheave wheel carried by said arm, and a driving chain connecting the aforesaid sprocket with the said pinion, the slack portion of said driving chain adapted to ride over and engage with said sheave wheel.

4. In a device of the character specified, the combination with a vehicle, mounted on ground wheels and having attached to one of said wheels a sprocket wheel, of an end-gate secured to the rear end of the vehicle, a bracket attached to the end-gate, a driving shaft journaled in said bracket, a pinion slidably carried on the outer end of the shaft and having a clutch face, clutch devices secured to the shaft with which the pinion is adapted to have engagement, a member connected with said pinion and adapted to be moved therewith, an arm adjustably connected with said member, a sheave wheel carried by said arm, a driving chain connecting the aforesaid sprocket with the said pinion, the slack portion of said driving chain adapted to ride over and engage with said sheave wheel, and means for connecting and disconnecting the pinion with the clutch devices and simultaneously shift the said sheave wheel.

5. In a device of the character described, the combination of a driving shaft, a pinion slidably carried on said shaft and provided with a clutch face, clutch devices secured to said shaft with which the pinion is adapted to have engagement, a member connected with said pinion and having a serrated face, an arm pivotally connected with said member and having a corresponding serrated face, a sheave wheel carried by the arm a driving chain engaging said pinion and riding over said sheave wheel.

6. In a device of the character described, the combination of a driving shaft, a pinion slidably carried on the shaft and provided with a clutch face and a grooved sleeve, clutch devices secured to the shaft with which the clutch face of the pinion is adapted to have engagement, a support engaging the grooved sleeve of the pinion, an arm adjustably connected with said support, a sheave wheel carried by the arm, a driving chain engaging said pinion and adapted to ride over the sheave wheel, a rod connected at one end with the said support and means connected with the opposite end of said rod to facilitate in shifting the same, and thereby simultaneously move the pinion and support longitudinally on the driving shaft.

7. In a device of the character described, the combination of a driving shaft, a pinion slidably carried on the shaft and provided with a clutch face and a grooved sleeve, clutch devices secured to the shaft with which the clutch face of the pinion is adapted to have engagement, a support engaging the grooved sleeve of the pinion, an arm adjustably connected with said support, a sheave wheel carried by the arm, a driving chain engaging said pinion and adapted to ride over the sheave wheel, a rod connected at one end with the said support, a lever connected with the opposite end of said rod adapted to shift the same and simultaneously move the pinion and support, and means in connection with said lever for locking it against displacement after the shifting thereof.

8. In a device of the character specified, the combination with a vehicle, mounted on ground wheels and having attached to one of said wheels, a sprocket wheel, of an end-gate secured to the rear end of the vehicle, a bracket attached to the end-gate, a driving shaft journaled in said bracket, a pinion slidably carried on said shaft and having a clutch face, clutch devices secured to said shaft with which the pinion is adapted to have engagement, a member connected with said pinion and adapted to be moved therewith, a sheave wheel suitably carried by said member, and a driving chain connecting the aforesaid sprocket with the said pinion, the slack portion of said driving chain adapted to ride over and engage with said sheave wheel.

9. In a device of the character described, the combination of a shaft, a pinion slidably carried on said shaft and provided with a clutch face, clutch devices suitably supported with which the pinion is adapted to have engagement, a member connected with said pinion, a sheave wheel supported from said member, and a driving chain engaging said pinion and riding over said sheave wheel.

10. In a device of the character described, the combination of a shaft, a pinion slidably carried on said shaft, a member connected with said pinion, and a sheave wheel supported by said member and extending across and below the path of rotation of said pinion.

11. In a device of the character described, the combination of a shaft, a pinion slidably carried on said shaft and provided with a clutch face, clutch devices suitably supported with which the pinion is adapted to have engagement, a member connected with said pinion, and a sheave wheel supported by said member projecting across and below the path of rotation of said pinion.

12. In a device of the character described, the combination with an end-gate, of a shaft, a pinion carried on the said shaft, means for reciprocating the pinion on the shaft, and a sheave wheel supported in proximity to said pinion.

13. In a device of the character described, the combination with an end-gate, of a shaft, a pinion slidably carried on said shaft, clutch devices with which said pinion is adapted to engage, a sheave wheel supported in proximity to said pinion, and means common to said pinion and sheave wheel for moving the same simultaneously.

14. In a device of the character described, the combination, of an end-gate, of a shaft, a pinion having a clutch face slidably mounted on said shaft, clutch devices also carried by said shaft with which said pinion is adapted to engage, mechanism for shifting said pinion, a sheave wheel, and means for supporting said sheave wheel in connection with said mechanism, whereby the said sheave wheel may be simultaneously shifted with said pinion.

15. In a device of the character described, the combination with an end-gate, a shaft, a pinion having a clutch face slidably mounted on said shaft, clutch devices mounted on said shaft with which said pinion is adapted to engage, mechanism for disengaging said pinion from the clutch devices, and a sheave wheel supported in proximity to said pinion over which the driving means for said pinion may ride.

16. In a device of the character described, the combination with an end-gate, a shaft, a pinion having a clutch face slidably mounted on said shaft, clutch devices mounted on said shaft with which said pinion is adapted to engage, a member connected with said pinion, a sheave wheel rotatably connected with said member over which the driving means for said pinion may ride, a rod connected with said member, and means for moving said rod and simultaneously move said pinion and sheave wheel.

17. In a device of the character described, a removable end-gate for vehicles, a shaft supported from said end-gate, a pinion slidably carried on one end of said shaft and adapted to have a clutch engagement therewith, means for disconnecting said pinion from the shaft, a sheave wheel suitably supported below and in proximity to said pinion, whereby the driving means for said pinion may have engagement at all times with said sheave wheel.

In testimony whereof I affix my signature, in presence of two witnesses.

CHARLES P. SESTER.

Witnesses:
CHAS. N. LA PORTE,
ROBT. N. McCORMICK.